United States Patent [19]

Belart et al.

[11] Patent Number: 4,750,789

[45] Date of Patent: Jun. 14, 1988

[54] VEHICULAR HYDRAULIC BRAKE SYSTEM WITH ANTI-LOCKING

[75] Inventors: Juan Belart, Walldorf; Wolfram Seibert, Darmstadt; Norbert Ocvirk, Offenbach am Main, all of Fed. Rep. of Germany

[73] Assignee: Alfred Teves GmbH, Frankfurt Am Main, Fed. Rep. of Germany

[21] Appl. No.: 35,258

[22] Filed: Apr. 2, 1987

Related U.S. Application Data

[63] Continuation of Ser. No. 783,851, Oct. 3, 1985, abandoned.

[30] Foreign Application Priority Data

Nov. 24, 1984 [DE] Fed. Rep. of Germany ....... 3442908

[51] Int. Cl.[4] .............................. B60T 8/32; B60T 8/44
[52] U.S. Cl. .................................. 303/114; 60/547.1; 303/119
[58] Field of Search ............... 303/114, 115, 116, 117, 303/119, 113, 91–92, 61–63, 68–69, 6 A, 100, 6 R, 52, 101; 188/181 A, 345, 181 R, 355–359; 60/547.1, 545, 591, 574–579, 548

[56] References Cited

U.S. PATENT DOCUMENTS

| | | | |
|---|---|---|---|
| 3,556,608 | 1/1971 | MacDuff et al. | 303/114 |
| 3,729,235 | 4/1973 | Bach et al. | 303/114 |
| 3,768,874 | 10/1973 | Riordan | 303/114 X |
| 3,910,645 | 10/1975 | Takeuchi et al. | 303/114 |
| 3,910,643 | 10/1975 | Kobashi et al. | 303/114 |
| 3,922,023 | 11/1975 | Harries | 303/114 |
| 3,927,915 | 12/1975 | Adachi | 303/114 |
| 4,254,623 | 3/1981 | Dauvergne | 60/548 |
| 4,340,257 | 7/1982 | Belart | 303/114 |
| 4,416,491 | 11/1983 | Belart et al. | 303/52 X |
| 4,483,144 | 11/1984 | Steffes | 60/548 |
| 4,492,413 | 1/1985 | Belart et al. | 303/114 X |
| 4,523,791 | 6/1985 | Belart et al. | 303/114 X |
| 4,530,209 | 7/1985 | Steffes | 60/547.1 |
| 4,565,411 | 1/1986 | Seiber | 303/114 X |
| 4,582,365 | 4/1986 | Belart | 303/114 |
| 4,586,591 | 5/1986 | Belart | 303/114 X |
| 4,592,599 | 6/1986 | Belart | 60/591 X |
| 4,598,955 | 7/1986 | Belart et al. | 303/114 |
| 4,634,190 | 1/1987 | Wupper | 303/114 |
| 4,641,895 | 2/1987 | Belart et al. | 303/114 X |

FOREIGN PATENT DOCUMENTS

1940632 10/1979 Fed. Rep. of Germany .
3241662 5/1984 Fed. Rep. of Germany .

*Primary Examiner*—Douglas C. Butler
*Attorney, Agent, or Firm*—James B. Raden; Robert P. Seitter

[57] ABSTRACT

A vehicular hydraulic brake system with anti-locking, wherein there is provided a master cylinder (27) with a power booster (9) connected upstream thereof for the purpose of supplying the brake-actuating members (32, 33, 36 37) with pressure. Valves (34, 35, 38, 39) are provided for the pressure control of the brake-actuating members (32, 33, 36, 37) and wherein a pressure piston (23) of the hydraulic power booster (9) can be acted upon by the pressure of an auxiliary pressure source (1) in the brake's release direction. To structurally simplify the brake system, the present invention provides that a housing chamber (24) which can be acted upon by the pressure of an unpressurized supply reservoir (5) or of the auxiliary pressure source (1), alternatively, is confined by an end face of the pressure piston (23) remote from the pedal.

4 Claims, 1 Drawing Sheet

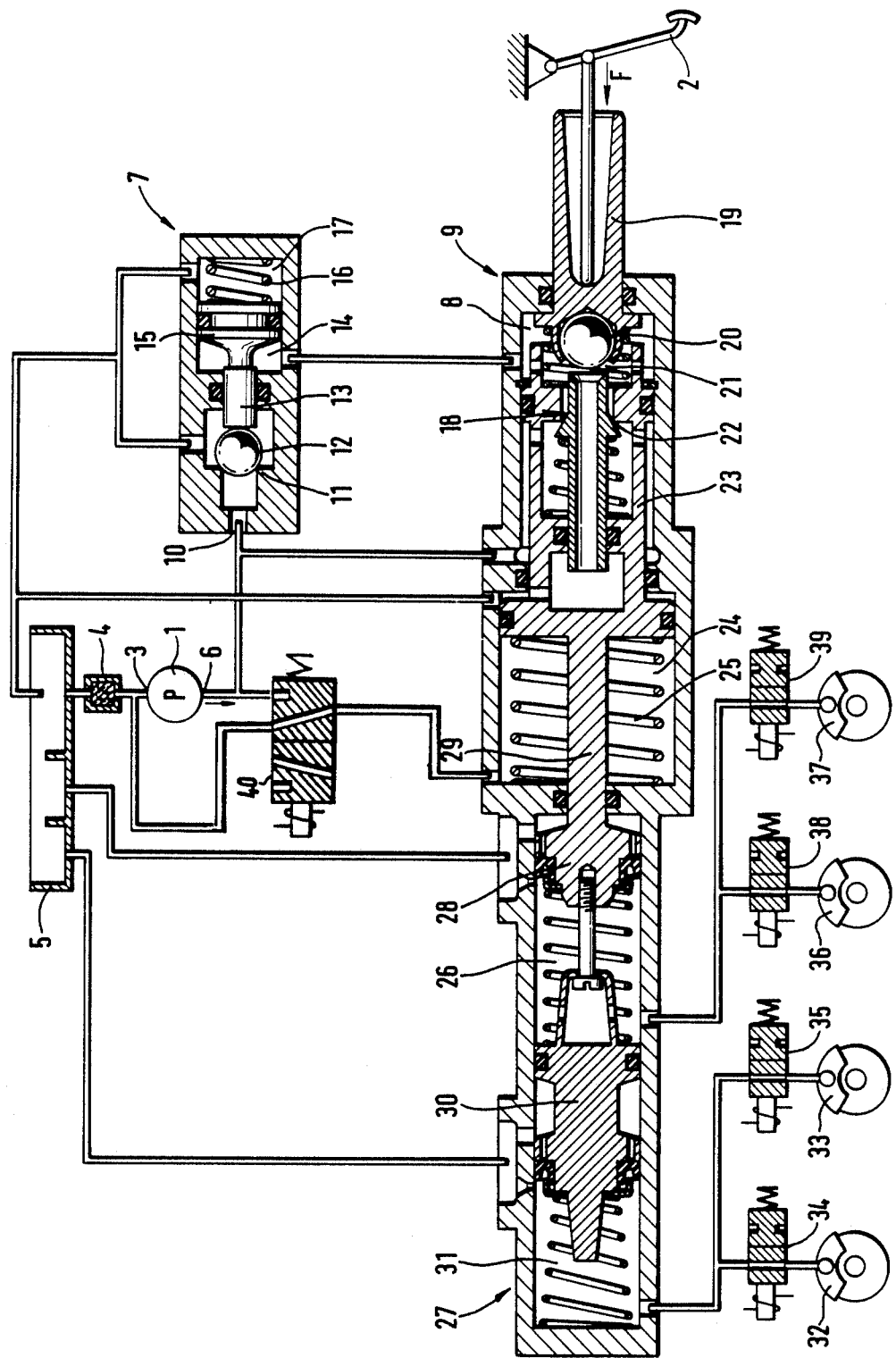

VEHICULAR HYDRAULIC BRAKE SYSTEM WITH ANTI-LOCKING

This application is a continuation of application Ser. No. 783,851, filed Oct. 3, 1985, now abandoned.

BACKGROUND OF THE INVENTION

The present invention relates to a vehicular hydraulic brake system with anti-locking, wherein a master cylinder with a power booster connected upstream thereof is provided for the purpose of supplying the brake-actuating members with pressure. Valve means are provided for the pressure control of the brake-actuating member and a pressure piston of the hydraulic power booster is applied by the pressure of an auxiliary pressure source in the brake release direction.

In such brake systems, it is known to arrange a resetting sleeve coaxially to the pressure piston, which resetting sleeve is pressurizable after corresponding valve means have been switched over so as to cause displacement of the pressure piston in the brake release direction. It is a disadvantage in this known device that the resetting sleeve encompasses the pressure piston with corresponding seals so that, on the one hand, a relatively complicated structure is the result and, on the other hand, a resetting of the pressure piston will not take place until the friction forces between the resetting sleeve and the pressure piston, on the one side, and the resetting sleeve and the housing, on the other side, have been overcome. Further, the device requires close manufacturing tolerances. In addition, the assembly of such a device is time-consuming; accordingly, correspondingly high manufacturing costs are incurred.

It is, therefore, an object of the present invention to simplify the construction of a braking pressure generator of the type referred to.

SUMMARY OF THE INVENTION

This object is achieved by the present invention in that a housing chamber adapted to be acted upon alternatively by the pressure of a an unpressurized supply reservoir or of the auxiliary pressure source is confined by an end face of the pressure piston remote from the pedal. In a given embodiment, the pressure piston can be displaced easily in the actuating direction as long as there is a connection between the housing chamber and the unpressurized supply reservoir. After appropriate valve means have been switched over, the housing chamber is connectible to the auxiliary pressure source so that the pressure generated by the auxiliary pressure source will act upon an effective surface of the pressure piston such that the pressure piston becomes subject to a force component in the brake release direction.

In a particularly favorable embodiment of the present invention, an extension is shaped at the end of the pressure piston remote from the pedal, the end remote from the pedal of said extension being designed as master cylinder piston. In a similar embodiment, the master cylinder piston is of integral design with the pressure piston, as a result whereof the process of manufacture and assembly is considerably simplified.

BRIEF DESCRIPTION OF THE DRAWING

One embodiment of the present invention will be described in more detail hereinbelow in conjunction with the accompanying drawing wherein the single drawing figure provides a sectional view of the brake system in accordance with the present invention.

DETAILED DESCRIPTION

In the drawing, reference numeral 1 designates a pressure fluid pump which will be put into operation by means of a brake pedal contact (not shown) when force is applied on a brake pedal 2. The suction side 3 of the pressure fluid pump 1 is by way of a fluid filter 4 in communication with an unpressurized supply reservoir 5. Connected to the pressure side 6 of the pressure fluid pump 1 is a control valve 7, the function of which is to bring about a pressure in a pressure chamber 8 of a hydraulic power booster 9 that is proportional to the respective actuating force, when the brake is actuated.

Referring now in more detail to the control valve 7, an inlet 10 which is in communication with the pressure side 6 of the pressure fluid pump is connected with a valve seat 11. A closing member 12 designed as a ball is movable into abutment with valve seat 11. In the brake release position as viewed in the drawing, the closing member 12 is placed on the valve seat 11 and a piston 13 is in mechanical contact with the closing member 12. The piston 13 sealedly projects into a housing chamber 14 which is in hydraulic communication with the pressure chamber 8 of the hydraulic power booster 9. The housing chamber 14 is confined by a piston 15 which, in turn, is biased by a compression spring 16 in the closing direction of the valve passage 11, 12. A housing chamber 17 accommodating the compression spring 16 is permanently connected with the unpressurized supply reservoir 5 by way of corresponding pressure lines. The valve passage 11, 12 is utilized to control a connection between the pressure side 6 of the pressure fluid pump 1 and the unpressurized supply reservoir 5.

The hydraulic power booster 9 includes an open-center control valve 18, by which a hydraulic connection between the pressure side 6 of the pressure fluid pump 1 and the pressure chamber 8 of the hydraulic power booster 9 is closed in the brake release position as illustrated in the drawing. When force is applied to the brake pedal 2, a piston rod 19 with a closing member 20 formed thereon will be displaced so as to establish a connection between the pressure side 6 of the pressure fluid pump 1 and the pressure chamber 8 of the hydraulic power booster 9. After closure of a first valve passage 21, a second valve passage 22 will be opened.

The hydraulic power booster 9 comprises a pressure piston 23 which is designed as a stepped piston and which confines a housing chamber 24. The pressure piston 23 is biased by a compression spring 25 in the brake release direction, the compression spring 25 being located in the housing chamber 24. Furthermore, the pressure piston 23 of the hydraulic power booster 9 comprises an extension remote from the pedal, which extension extends sealedly into a working chamber 26 of a master cylinder 27 and which is designed as master cylinder piston 28 at the end remote form the pedal. The working chamber 26 of the master cylinder 27 is confined by another master cylinder piston 30 which pressurizes a second working chamber 31 of the master cylinder 27.

Wheel brakes 32, 33 are connected to the working chamber 31 of the master cylinder 27, each by one two-way/two-position directional control valve 34, 35 arranged between the wheel brakes 32, 33 and the working chamber 31. The valves are controllable by slip control electronics (not shown) and normally assume an opened position. On corresponding actuation of the two-way/two-position directional control valves 34, 35, a hydraulic connection between the working chamber 31 of the master cylinder 27 and the wheel brakes 32, 33 can be closed. Similarly, wheel brakes 36, 37 are connected to the working chamber 26 of the master cylinder 27, and two two-way/two-position directional control valves 38, 39 are likewise inserted into the connection between the wheel brakes 36, 37 and the working chamber 26 which valves, with respect to their design and their function, correspond to the valves 34, 35.

At the pressure side 6 of the pressure fluid pump 1, there is further connected a three-way/two-position directional control valve 40 which normally serves to establish a connection between the unpressurized supply reservoir 5 and the housing chamber 24. The three-way/two position directional control valve 40 can be switched by the non-illustrated slip control electronics to assume a position in which the pressure side 6 of the pressure fluid pump 1 is connected to the housing chamber 24, while simultaneously the connection between the housing chamber 24 and the unpressurized supply reservoir 5 will be interrupted. A like change-over of the three-way/two-position directional control valve 40 takes place as soon as critical slip values occur at one or at several of the vehicle wheels allocated to the wheel brakes 32, 33, 36, 37.

The mode of function of the brake system described will be explained in more detail hereinbelow, with reference to the brake release condition in which all movable parts adopt the position illustrated in the drawing. When force is applied on the brake pedal 2, the drive of the pressure fluid pump 1 will be started by way of the non-illustrated brake pedal contact so that the pressure fluid pump 1 will make available a corresponding fluid volume at its pressure side 6. In this operating state, the control valve 7 ensures that the pressure prevailing at the pressure side 6 of the pressure fluid pump 1 is maintained at a certain level. If, for instance, the pressure at the pressure side 6 of the pressure fluid pump 1 rises, the closing member 12 will be lifted from the valve seat 11 so that pressure fluid is returned to the unpressurized supply reservoir 5.

In the event of increase of the actuating force F acting on the brake pedal 2, first the closing member 20 will move into abutment on the valve passage 21, whereby the pressure chamber 8 of the hydraulic power booster is shut off hydraulically. With the force on the brake pedal 2 continuing to increase, the valve passage 22 will open and thereby establish connection between the pressure side 6 of the pressure fluid pump 1 and the pressure chamber 8 of the hydraulic power booster 9 by way of corresponding pressure conduits. The pressure that is now prevailing in the pressure chamber 8 of the hydraulic power booster 9 propagates to the housing chamber 14 of the control valve 7 and acts upon the piston 13 in the closing direction of the valve passage 11, 12 so that the pressure on the pressure side 6 of the pressure fluid pump 1 rises, with the result that the pressure piston 23 will displace in the actuating direction in the presence of sufficient pressure in the pressure chamber 8. Displacement of the pressure piston 23 has as a consequence that because of the displacement of the master cylinder piston 28, hydraulic pressure will develop in the working chamber 26 of the master cylinder 27 which is fed to the wheel brakes 36, 37 by way of the two-way/two-position directional control valves 38, 39. The accumulated pressure in the working chamber 26 of the master cylinder 27 likewise displaces the master cylinder piston 30 in the actuating direction, thus also causing pressurization of the working chamber 31 of the master cylinder 27. The pressure of the working chamber 31 propagates by way of the two-way/two-position directional control valves 34, 35 to the wheel brakes 32, 33. In this operating condition, in which there is communication between the housing chamber 24 and the unpressurized supply reservoir 5, the pressure piston 23 can be displaced easily in the actuating direction in opposition to the force of the relatively weak compression spring 25.

If the hydraulic pressure in the working chambers 26, 31 of the master cylinder 27 rises to the point that the non-illustrated slip control electronics recognizes an imminent locked condition at one or at several of the vehicle wheels allocated to the wheel brakes 32, 33, 36, 37, the three-way/two-position directional control valve 40 will change over. After the three-way/two-position directional control valve 40 has changed over, a hydraulic connection between the pressure side 6 of the pressure fluid pump 1 and the housing chamber 24 is provided while a connection between the housing chamber 24 and the unpressurized supply reservoir 5 is shut off simultaneously. The pressure which developed in the housing chamber 24 acts upon the pressure piston 23 of the hydraulic power booster 9 in the brake release direction so that the pressure piston 23 and, respectively, the brake pedal 2 displaces in the brake release direction in opposition to the actuating force. Thus, a sufficient amount of pressure fluid is always available in the working chambers 26, 31 of the master cylinder 27.

In the embodiment illustrated in the drawing, provision is made so that an imminent locked condition can be averted by actuation of one or several of the valves 34, 35, 38, 39. Further additional valve means can be allocated to the wheel brakes 32, 33, 36, 37 which are controllable by the slip control electronics and through which pressure fluid can be taken from the wheel brakes 32, 33, 36, 37 and returned to the unpressurized supply reservoir 5.

What is claimed is:

1. An anti-locking hydraulic brake system for automotive vehicles having vehicle wheels and wheel brakes, said system comprising, in combination:

a master cylinder having a piston slidably mounted therein;

a plurality of pressure fluid lines respectively connecting each of said wheel brakes with said master cylinder;

a plurality of normally open control valves respectively provided in each of said pressure fluid lines between said master cylinder and said wheel brakes;

a pedal-actuated booster integrally formed with said master cylinder and having a pressure piston slidably mounted therein between a pressure chamber adjacent to the outer end of said booster and a housing chamber at the inner end of said booster adjacent to said master cylinder, said pressure piston being directly slidable on the interior walls of a booster chamber surrounding said pressure piston, said pressure piston of said booster being connected to said piston of said master cylinder and forming a one-piece member therewith and said pressure piston being stepped wherein the effective area of its end which faces said housing chamber is greater than the effective area of its other end;

an auxiliary pressure source;

an unpressurized supply reservoir;

a first pressure control valve (7) connected between said pressure source and said supply reservoir and having a pressure control input connected to said pressure chamber; and, a second pressure control valve (40) connected between said pressure source and said housing chamber for selectively connecting said pressure source to said housing chamber in response to an imminent locking condition.

2. The system according to claim 1 wherein said second pressure control valve is a three-way/two position valve for alternatively connecting said housing chamber to said pressure source and said supply reservoir in response to a control input.

3. The system according to claim 1 wherein said first control valve includes a valve seat member connected to said pressure source and a valve member resiliently urged into engagement with said valve seat to close the connection between said pressure source and said supply reservoir until a momentary increase in pressure in said pressure source lifts said valve member away from said valve seat but wherein an increase in pressure in said pressure chamber forces said valve member against said valve seat to allow the pressure in said pressure source to increase.

4. The system according to claim 3, wherein said other end of said pressure piston includes a pedal-actuated closing valve which opens a connection between said pressure source and said pressure chamber in response to pedal actuation.

* * * * *